Nov. 24, 1931.    N. W. CUMMINGS    1,833,277
APPARATUS FOR HEATING ORCHARDS
Filed May 29, 1929
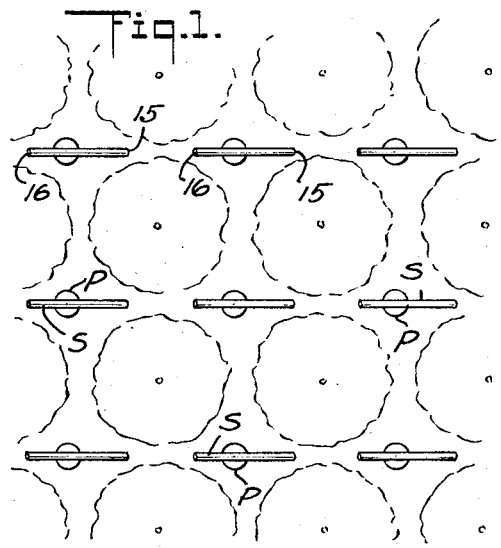
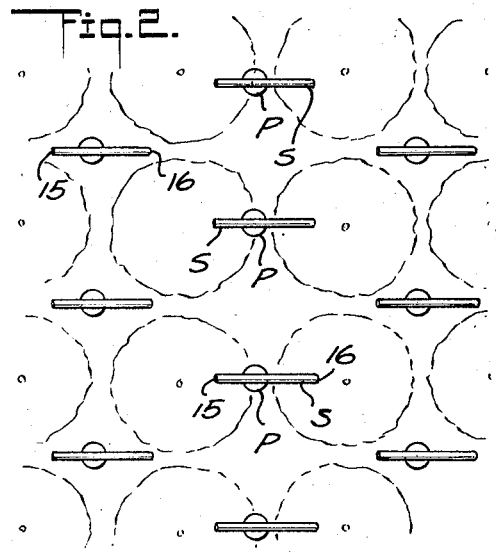
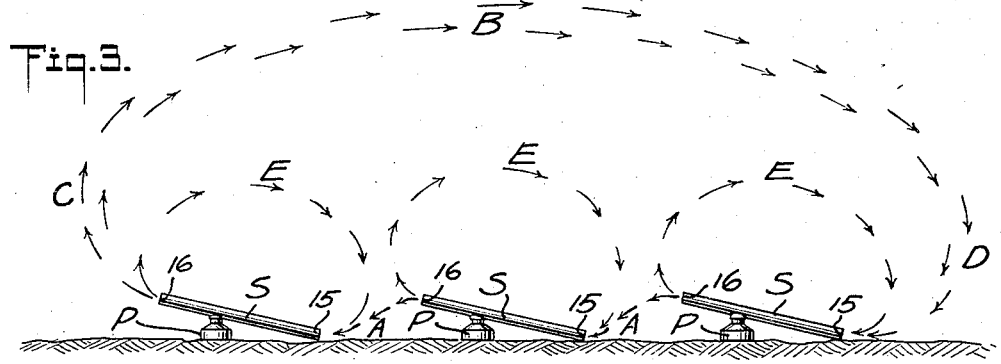
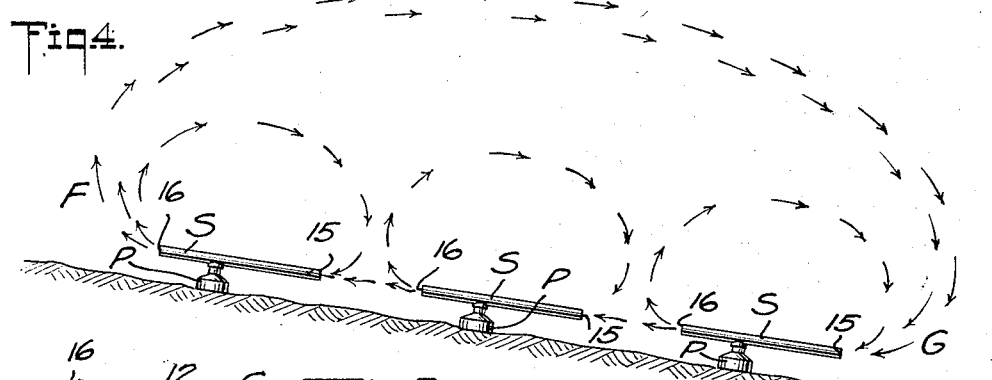
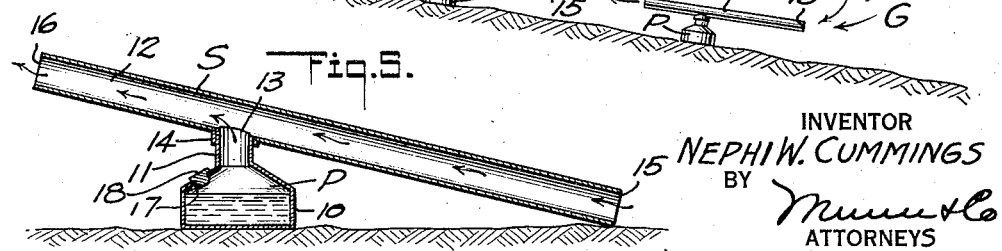
INVENTOR
NEPHI W. CUMMINGS
BY
ATTORNEYS Patented Nov. 24, 1931

1,833,277

UNITED STATES PATENT OFFICE

NEPHI W. CUMMINGS, OF SAN BERNARDINO, CALIFORNIA

APPARATUS FOR HEATING ORCHARDS

Application filed May 29, 1929. Serial No. 366,986.

My invention relates generally to the artificial heating of the air in fruit orchards in a manner to prevent the damaging effects of frost upon the fruit.

When air in an orchard is artificially heated by means of the conventional forms of smudge pots, as is the present practice, the density of the air is decreased so that it rises and is displaced below by colder and heavier air from surrounding areas. However, when the heated rising air reaches a height at which its temperature is equal to that of the surrounding air, its upward motion is arrested and the air functions as a ceiling placing an upper limit to which air can rise as a result of being artificially heated to a predetermined temperature at the ground level. When the artificially heated air reaches its ceiling it spreads out laterally over adjacent areas so that the orchard functions in the manner of a huge chimney creating a large influx of air from the surrounding areas at the ground level.

It will be clear that the volume of this influx of cold air will depend on the average temperature to which the air within the orchard is heated, because the higher the temperature, the more rapid will be the upward current of air over the orchard and hence the more rapid must be the influx of air from the surrounding areas to replace the rising heated air. Moreover, if the average temperature of the artificially heated air in the orchard is relatively high, the air will rise to a great height before its upward flow is arrested and hence the total mass of air which must be heated during the initiation of the heating process will be such as to cause the wasteful use of fuel with its attendant expense. It is therefore very desirable to reduce the height or ceiling of the ascending heated air to as great an extent as possible so as to reduce the volume and rapidity of influx of cold air from the surrounding areas which replaces the heated air, and this can be accomplished only by maintaining a low average temperature throughout the orchard, which temperature is sufficiently high to prevent the damaging effects of frost upon the fruit.

It is a purpose of my invention to provide a method of and apparatus for heating orchards by which the air in the orchard will be maintained at a relatively low temperature sufficiently high to prevent the damaging effects of frost upon the fruit so that the quantity of fuel expended to obtain the necessary heating will be reduced to a minimum as a result of the decrease in the influx of cold air to replace the heated air and the decrease in the length of the column of air which must be heated before the ceiling is reached, as well as by the reduction of radiation losses to a minimum.

More specifically my method and apparatus functions to create a unidirectional circulation of artificially heated air throughout predetermined areas in the orchard, which air is caused to travel in the form of a vortex having a relatively low ceiling, all in such manner that the influx of cold air will be reduced to a minimum and substantially the same air heated again and again as the heating operation progresses so that sufficient heating of the air to prevent damage to the fruit will be effected with a minimum consumption of fuel.

I will describe only one method of and one form of apparatus for heating orchards embodying my invention and will then point out the novel features thereof in claims.

In the accompanying drawings,

Fig. 1 is a view showing in plan one form of apparatus for heating orchards embodying my invention, and illustrating an arrangement of the apparatus in an orchard.

Fig. 2 is a view similar to Fig. 1 and illustrating another arrangement of the apparatus shown in Fig. 1, in an orchard.

Fig. 3 is a view in side elevation of the apparatus shown in Fig. 1 in association with an orchard on substantially level ground.

Fig. 4 is a view similar to Figure 3 and illustrating the application of the apparatus to an orchard on sloping ground; and Fig. 5 is an enlarged vertical sectional view of the apparatus.

Referring specifically to the drawings in which similar reference characters designate similar parts in each of the several views, my invention in its present embodiment comprises a heating unit illustrated as a conventional type of smudge pot P (Figure 5) embodying a receptacle 10 adapted to contain a quantity of fuel oil, and having an upright stack 11 through which the hot gases of combustion are ordinarily discharged into the atmosphere, as will be understood by those familiar with the art. In carrying my invention into practice, I provide a branch stack S in the present instance in the form of an open ended pipe 12 having a side opening 13 intermediate its ends, surrounded by a collar 14 snugly receiving and secured to the upper extremity of the stack 11 to support the stack S from the smudge pot at a slight inclination to the horizontal so that when the smudge pot is resting on the ground in an orchard one end of the stack S constituting an inlet 15 will be lower than its other end which constitutes an outlet 16.

The manner in which the heating method embodying my invention is performed with the form of apparatus above described is as follows:

Let it be assumed that a number of the smudge pots having branch stacks S applied thereto, are arranged in an orchard on level ground, one in advance of the other in rows as shown in Figure 1 or in alternately staggered relation as shown in Figure 2, so that the branch stacks S are in substantial parallelism and incline upwardly in one and the same direction. With quantities of fuel oil supplied to the receptacles 10 and ignited through an opening 17 closed by a removable cap 18, it will be clear that the hot gases of combustion rising through the stack 11 of each smudge pot, will pass into the branch stack S and discharge from its outlet 16, thus creating a draft in the branch stack S causing air to be sucked into the stack through its inlet 15 and be mixed with and heated by the hot gases of combustion.

Due to the arrangement of the branch stack S one in advance of and parallel to each other, a large majority of the heated air discharging from the outlets 16 of each stack will be sucked into the inlet 15 of the stack next in advance as indicated by the arrows A in Fig. 3, the heated air after traversing the branch stacks of each row of smudge pots, finally discharging from the outlet 16 of the branch stack of the last smudge pot of each row and then rising.

A large volume of heated air will thus be discharged into the region above the branch stacks of the last smudge pots of each row as indicated at C in Figure 3 and will initially be drawn from the region indicated at D through the inlets 15 of the branch stacks of the first smudge pots of each row. As there can be no permanent accumulation of air at C and no permanent diminution of air at D due to the tendency of air to equalize in pressure, the heated air at C upon reaching its ceiling is caused to flow from region C to region D as indicated by the arrows B in Figure 3 rather than the heated air at C flowing to remote regions and the air at D being drawn from remote regions, as this latter mode of functioning would require such a long period of time that the direct flow of air from C to D would take preference. Thus although the air flowing from C to D is warmer than the air which has not been heated, it is colder than the air discharging from the branch stacks of the last smudge pots of each row, so that the rising current at C must be compensated for by the downward current at D. The vortex indicated by the arrows A and B will thus be created and the same air will traverse the cycle repeatedly except for such small amount of unavoidable mixing with extraneous unheated air. Thus the heat applied to the air will be conserved except for this small amount of mixing and radiation to the atmosphere.

Additional vortexes indicated by the arrows E in Figure 3 and including each branch stack S will also be created, as the inlet 15 of each branch stack will draw in air from the immediate vicinity rather than from remote regions, which condition also exists with regard to the inlets of the branch stacks of each row in creating the general vortex indicated by the arrows A and B as above described.

In addition, all the heat discharged into the orchard will tend to maintain the general vortex in the direction from the lower end of each branch stack to the upper end, as the kinetic energy is conserved, so that a minimum temperature difference between the air at the ground level and the air at the ceiling of the vortex will be obtained with the advantage of conserving fuel while heating the air to a relatively low temperature, sufficiently high to prevent the damaging effects of frost upon the fruit.

In the application of my apparatus to an orchard on sloping ground as illustrated in Figure 4, it will be clear that the natural drift of heated air up the slope will facilitate the maintenance of the vortex, for it will be clear that a large volume of heated air will be discharged into the region at the upper end of the slope as indicated at F in Figure 4 and will initially be withdrawn from the region at the lower end of the slope as indicated at G in this figure. As there can be no permanent accumulation of air at F and no permanent diminution of air at G consequently air must flow away from region F and into region G as the equalization of pressures is accomplished by a practically direct flow of air from F to G, for if this were not so, air from F would have to be carried to remote regions while air to G would have to be brought from remote regions, and would require such a large interval of time that the direct flow from F to G will have precedence as above described in conjunction with the apparatus installed in an orchard on level ground.

It will be appreciated that although the air descending towards G is warmer than air which has not been heated, it is nevertheless colder than the air rising towards F and consequently the rising current of air at the uppermost branch stacks S must be compensated for, to a large extent by a downward current of air at the lowermost branch stacks. The vortex above referred to will be created irrespective of whether the orchard is on sloping or level ground and the same air will pass through the cycle repeatedly except for a small amount of unavoidable mixing with extraneous unheated air. As a result, the heat once applied to the air will be conserved except for this small amount of mixing and for radiation to the upper atmosphere. It is only necessary that the branch stacks be disposed at a slight inclination to the horizontal to insure that the unidirectional circulation of air in the form of a vortex traveling in substantially a vertical plane and having a relatively low ceiling, will be created and maintained so long as sufficient fuel is burning in the smudge pots to heat the air in the orchard to a low average temperature, sufficiently high to prevent the damaging effects of frost upon the fruit.

Although I have herein shown and described only one method of and one form of apparatus embodying my invention, it is to be understood that various changes and modifications may be made therein without departing from the spirit of the invention and the spirit and scope of the appended claims.

I claim:

1. Orchard heating apparatus comprising a heating unit having a main stack and an inclined branch stack communicating intermediate its ends with the main stack and having an air inlet at one end and an outlet at its other end for the discharge of hot gases of combustion.

2. Orchard heating apparatus comprising a heating unit having a main stack, and a branch stack communicating intermediate its ends with the main stack and having an air inlet and an outlet for the hot gases of combustion, disposed at a higher elevation than the air inlet.

3. Orchard heating apparatus comprising a heating unit having a main stack, and an open ended pipe constituting a branch stack communicating intermediate its ends with the main stack, one end of the branch stack constituting an air inlet and the other end of the branch stack constituting an outlet for the hot gases of combustion from the unit and being disposed at a higher elevation than the air inlet.

4. Orchard heating apparatus comprising a smudge pot having an upright stack, an open ended pipe constituting a branch stack and communicating intermediate its ends with the upper extremity of the upright stack, one end of the pipe constituting an air inlet and the other end of the pipe constituting an outlet for the hot gases of combustion from the smudge pot and being disposed at a higher elevation than the inlet.

5. Orchard heating apparatus comprising a heating unit, and a stack into which hot gases of combustion from the unit are discharged, the stack having an air inlet and an outlet for the hot gases of combustion, remote from the air inlet in a horizontal direction and at a higher elevation than the air inlet.

NEPHI W. CUMMINGS.